United States Patent [19]

Laan

[11] 4,452,636
[45] Jun. 5, 1984

[54] BUILDING ELEMENTS CONTAINING CEMENT AND SPHERES OF EXPANDED, POROUS FOAMED RESIN

[76] Inventor: Dirk Laan, Beeldhouwerstraat 17, 6824 Arnhem, Netherlands

[21] Appl. No.: 253,760
[22] PCT Filed: Jul. 2, 1980
[86] PCT No.: PCT/NL80/00024
§ 371 Date: Mar. 3, 1981
§ 102(e) Date: Mar. 3, 1981
[87] PCT Pub. No.: WO81/00104
PCT Pub. Date: Jan. 22, 1981

[51] Int. Cl.³ ............................................. C09J 1/02
[52] U.S. Cl. .................. 106/76; 264/45.3; 264/69; 264/333
[58] Field of Search .......... 264/45.3, 69, 333, 35; 106/38.25, 38.35, 100, 78, 96, 76

[56] References Cited

U.S. PATENT DOCUMENTS

| | | | |
|---|---|---|---|
| 3,024,125 | 3/1962 | Lee | 106/38.35 |
| 3,326,701 | 6/1967 | Freyhold | 106/38.35 |
| 3,959,423 | 5/1976 | Boyd | 264/35 |
| 4,032,352 | 6/1977 | Pietsch | 106/78 |
| 4,032,352 | 6/1977 | Pietsch | 106/78 |
| 4,037,375 | 7/1977 | Maggos | 264/35 |
| 4,071,996 | 2/1978 | Moto | 264/35 |
| 4,170,093 | 10/1979 | Cappellini | 264/35 |

*Primary Examiner*—John Parrish
*Attorney, Agent, or Firm*—Martin Smolowitz

[57] ABSTRACT

A method for manufacturing porous shaped articles, such as flat or channel shaped insulation plates, blocks and similar building elements, in particular for building completely insulated houses, the articles obtained by this method and building constructions erected from these articles, in which method spheres of expanded porous resinous foamed material are blended with a binder, comprising a mixture of a bituminous product, and waterglass with a waterglass content of at the most 75% by weight, while at the end of this blending operation a quantity of particulate or powdery material including an additive such as sand is added to and co-blended with said blend until the mass again consists mainly of loose spheres, whereupon cement is added to the blend and the entire mixture is subjected again to a second mixing operation, while metering a quantity of water, and the mixture thus finally obtained is formed into the desired articles by compression and vibration followed by drying said articles in a self-supporting condition.

6 Claims, 4 Drawing Figures

BUILDING ELEMENTS CONTAINING CEMENT AND SPHERES OF EXPANDED, POROUS FOAMED RESIN

The invention relates to a method for manufacturing porous shaped articles, such as flat or channel shaped insulation plates, blocks and similar building elements, in which spheres of expanded porous resinous foamed material are blended with a binder, comprising a bituminous product, by means of which the adherence of the foamed resin to the cement in the final product is promoted, while at the end of this blending operation a quantity of particulate or powdery material is added to and co-blended with said blend until the mass again consists mainly of loose spheres, whereupon cement is added to the blend and the entire mixture is subjected again to a second mixing operation, while metering a quantity of water, and the mixture thus finally obtained is formed into the desired articles by compression followed by drying said articles.

Such method is known from the Dutch Patent Application No. 71.13658

The articles obtained by the known method smell heavily of the bituminous product added as the binder, so that they have to be left exposed to the open air for several days before they can be used for building houses or similar constructions.

Moreover the articles obtained by said known method have a relatively low compressive strength of about 5 kg/cm$^2$ due to which these articles are not suitable to be used directly for constructing walls, partitions and the like of houses, buildings and other structures.

The object of the invention is to provide an improvement in the known method so that the articles obtained by this method do not smell and will have such a high compressive strength that the articles can be used at once for constructing completely insulated houses, buildings and the like.

This object is attained in that in the method according to the invention the binder comprises a mixture of a bituminous product and waterglass with a waterglass content of at the most 75% by weight.

Preferably a quantity of an additive such as sand is added before subjecting the mixture to said second mixing operation while upon forming the mixture finally obtained into the desired articles by compression said mixture is also subjected to vibration and the articles are dried in a self-supporting condition.

The articles obtained in this way do not smell and have a compressive strength of at least 40 kg/cm$^2$ so that the articles are eminently suited for direct use in constructing walls and other parts of all types of buildings, said articles being furthermore strongly fire-resistant. Moreover the articles obtained after the compression and vibration operation may be directly dried in self-supporting lying condition and the articles do not have to be kept in molds during the drying period as is the case in the above mentioned known method.

When applying the method according to the invention the compression and vibration operation may be performed in an apparatus of the "Hydromat" type supplied by 'Hess Maschinenfabrik KG", destined for compression molding of common non-porous concrete blocks; the pressure applied when carrying out the method according to the invention however being appreciably lower than that required for the compression molding of the common concrete blocks.

Preferably the additive is added at the termination of the first mixing operation, i.e. the blending operation, this additive thus replacing part of the total amount of cement to be added in accordance with the known method whereas the total amount of cement is added at once during the second mixing operation.

When maintaining the addition of a part of the total quantity of cement to be added upon termination of the first mixing operation the additive may be added according to the inventive method when transferring the blend from the first to the second mixing operation.

The invention will now be elucidated further in detail with reference to the annexed drawing in which.

Figure 1:
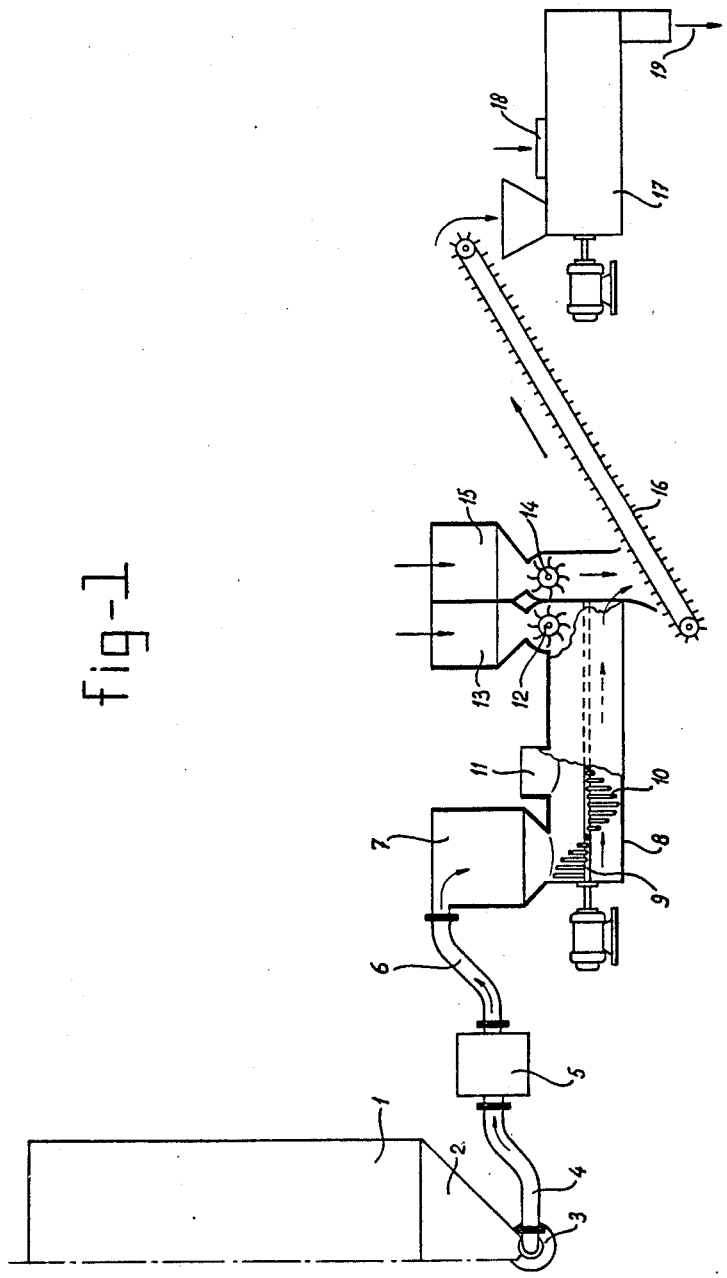
FIG. 1 shows diagrammatically an apparatus preferably used for carrying out the method according to the invention.

Spheres of expanded resinous foamed material produced in a way known per se are stored in a bin 1. These spheres may for instance consist of polystyrene and may have a diameter of from 3 to 5 mm and a density of about 10–12 kg/m$^3$. At the bottom of the conical lower section 2 of this bin there is provided a narrow rectangular discharge opening below which a conveyor screw is accomodated within a cylindrical housing 3 which is in direct communication with said discharge opening, said conveyor screw being driven by an electric motor which itself or of which a transmission gear mechanism is variable in speed within a broad range from stand still and gradually increasing number of rotations in order to drive the screw at a variable accurately controllable speed. The screw opens in a suction line 4 of an exhaustor 5 having a blade wheel the blades of which have rounded front edges so that the spheres may pass through the exhaustor without being damaged. The exhaustor 5 will blow the spheres through the line 6 to a bin 7 having a suitable vent for instance in the upper wall covered by a finely meshed sieve plate so that the air of the exhaustor may easily be discharged.

From the bin 7 the spheres will drop into a first blender 8 preferably consisting of a trough having two horizontal shafts 9 running parallel to each other, each one of said shafts being provided with radially projecting pins, which pins are each arranged in a staggered pattern in the direction of the circumference with respect to the adjacent pins so that the free ends of said pins follow a helix about the shaft. The blender 8 has a length of for instance 4 m while the pins on each one of the shafts are spaced apart at a distance of for instance 10 cm. The pins of the two shafts are in overlapping position with respect to each other i.e. that within the space between the two shafts a pin on the one shaft will slide along a pin on the other shaft, said shafts rotating in opposite directions in such a manner that the pins will have a downward movement within the space between said shafts. During a large part of the rotational movement the end of the pins will move at close distance along the trough wall of the blender. The pins make about 3 screw leads around the shaft. This type of blender is known in principle. The shafts are rotated at a speed of about 200 rpm. At a distance of about 90 cm beyond the discharge opening of the bin 7 there opens a feeder 11 for feeding a mixture of bituminous material and waterglass (for instance at a temperature of about 40° C.) by means of which an accurately metered quantity of said mixture is fed to the blender 8, said quantity being adapted to the quantity of resinous spheres supplied by the conveyor screw 3. The blending operation will now occur over a part of the path in the blender 8 whereupon at 12 a quantity of an additive, such as sand is fed to the blender from a hopper 13 by means of a cell wheel. Immediately before the addition of sand the resinous spheres will strongly adhere to each other due to the presence of the mixture of bitumen and waterglass, the temperature at that location preferably being about 40° C. After the addition of sand and the admixing thereof with said spheres there is again obtained a dry mass consisting of loose spheres already at a short distance after the feeding point of the sand. The spheres remain in the blender 8 for a period of from 2 to 6 minutes there being present only spheres and the mixture of bitumen and waterglass in the section covered by about the first three meters and additionally sand in the section covered by about the last meter.

The pins 10 on the shafts 9 do not have or hardly have a conveying action in the axial direction of the blender. Hence the conveyance in the axial direction is mainly due to displacement by freshly fed material. The mixture of bitumen and waterglass is fed in such a viscous liquid condition that it will flow back somewhat to the feeding station of the spheres so that the feeding location of said mixture is not very critical. The sand is not able to move far upstream and thus not able to reach any sphere not yet well coated with the bitumen waterglass mixture due to the aggregation of spheres and bitumen to larger aggregates immediately upstream of the location of the addition of sand.

At the discharge end of the blender 8 cement is fed at 14 from the hopper 15 on the first part of a conveyor belt 16. Both at 12 and 14 use may be made of cell wheels. By means of the belt 16 the spheres and the cement are transported to a second mixing apparatus 17 having a similar construction as the blender 8 though the mixing apparatus 17 may extend over a smaller length, for instance a length of 3m, the pins thereof covering 2½ screw leads. At a short distance from the inlet station fed by the belt 16, water is added at 18, the addition preferably being distributed over several points along the length of the mixing apparatus 16, for instance over a length of 1 m.

The final product is discharged from the mixing apparatus 17 at 19 whereupon the desired articles are molded by compression while vibrating. The articles are then placed in self-supporting condition on for instance a floor and dried during a period of usually from 12 to 24 hours, said drying period being dependent on the temperature.

Preferably polystyrene is used as the basic material for the foamed spheres, said spheres having a diameter of about 3 to 5 mm while there are added about 1 kg of bitumen, 2 kg of waterglass, 600 kg of sand, 250 kg of cement and 20 kg of water per 10 kg of foamed spheres.

The additive may also be added on the conveyor belt 16 instead of the addition at 12 in which case part of the cement is fed to the blender 8 at 12.

Figure 2:
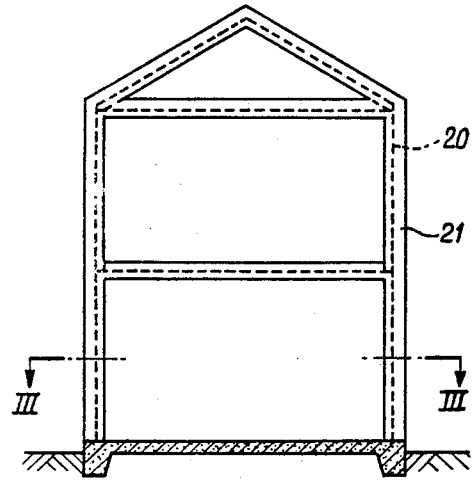
FIG. 2 shows diagrammatically a house completely built from articles obtained by the method according to the invention.
Figure 3:
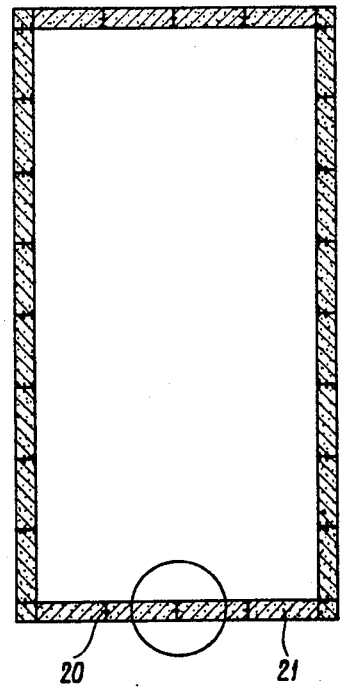
FIG. 3 is a cross sectional view taken along the line III—III in FIG. 2.
Figure 4:
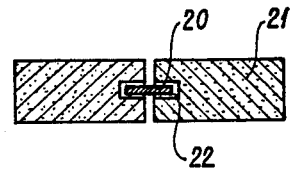
FIG. 4 shows the encircled portion in FIG. 3 on a larger scale.

As shown in FIGS. 2, 3 and 4 a house completely built from block-like articles obtained by the method according to the invention may comprise a skeleton construction 20 of steel, between the elements of which the block-like articles 21 are inserted, said articles being provided at their opposing end faces with recesses 22 which engage the skeleton-elements. Because of the outstanding heat-insulating properties of the block-like articles the steel skeleton construction embedded within said articles will not be distorted in case of a fire.

A house or similar building construction obtained according to the invention can be called an energy-saving house, as all its constructional elements such as walls, roof and floors are made of the articles obtained by the invention which articles have outstanding heat-insulating properties.

I claim:

1. In a method for manufacturing a building block comprising the steps of uniformly coating spheres of porous, expanded resinous foam material with a bonding agent consisting essentially of a bituminous product to form a sticky blend; mixing a quantity of particulate material with said blend to form a mass consisting mainly of loose coated spheres; mixing cement and water with said mass to form a final mixture; compressing said final mixture into block form and drying, the improvement comprising the step of incorporating sufficient waterglass into the bituminous product to form a mixture of bituminous product and waterglass with a waterglass content of at the most 75% by weight, so as to produce an odorless, dried block having a compressive strength of at least 40 kg/cm$^3$.

2. The method of claim 1, wherein the particulate material is sand, the final mixture is subjected to vibration during formation of the block, and the block is dried in a self-supporting condition.

3. The method of claim 1, wherein the particulate material comprises part of the total amount of cement and additional particulate material in the form of sand is added prior to addition of the remainder of the cement, and the final mixture is subjected to vibration during the formation of the block and the block is dried in a self-supporting condition.

4. A building block obtained by the method of claim 1.

5. The building block according to claim 4, wherein the foamed spheres consist of polystyrene, said spheres having a diameter of about 3 to 5 mm and there are added about 1 kg. of bitumen, 3 kg of waterglass, 600 kg of sand, 250 kg of cement and 20 kg of water per 10 kg of foamed spheres.

6. The building block according to claim 4, wherein said block is provided with recesses at its opposing end faces.

* * * * *